United States Patent
Buchta

[15] 3,694,624
[45] Sept. 26, 1972

[54] INFRARED RADIATOR ARRANGEMENT

[72] Inventor: Eberhard Buchta, Muenchen, Germany

[73] Assignee: Beckman Instruments GmbH

[22] Filed: June 24, 1970

[21] Appl. No.: 49,361

[30] Foreign Application Priority Data

July 16, 1969  Germany.......... P 19 36 245.9

[52] U.S. Cl..............219/358, 73/363 AR, 219/345, 219/355, 219/505, 219/553, 250/85, 338/308
[51] Int. Cl..........H05b 1/02, H05b 3/26, H01c 7/00
[58] Field of Search......219/339, 342, 343, 345–358, 219/377, 213, 457, 464, 449, 543, 552, 553, 504, 505; 338/22, 23, 25, 308, 309; 73/363 AR; 250/84, 85, 86, 88

[56] References Cited

UNITED STATES PATENTS

| | | | |
|---|---|---|---|
| 3,118,042 | 1/1964 | Parker | 219/358 X |
| 3,275,802 | 9/1966 | Vandivere | 219/345 UX |
| 3,105,136 | 9/1963 | Ashenfarb | 219/543 X |
| 2,545,805 | 3/1951 | Callender | 219/345 |
| 3,316,387 | 4/1967 | Waldron | 219/354 |
| 3,095,506 | 6/1963 | Dewey et al. | 219/553 X |
| 2,952,762 | 9/1960 | Williams et al. | 250/85 |

FOREIGN PATENTS OR APPLICATIONS 119,144  9/1918  Great Britain ........73/362 AR

OTHER PUBLICATIONS

" Metal–Film Resistance Thermometers For Measuring Surface Temperature," by Winding, et al.; Industrial and Engineering Chemistry; March 1955; Vol. 47, No. 3; pages 386– 391.

Primary Examiner—A. Bartis
Attorney—Paul R. Harder and Robert J. Steinmeyer

[57] ABSTRACT

An infrared radiator for use in infrared analyzers includes a ceramic platelet having a front surface and a rear surface. A thin heating resistance layer is deposited on the front surface. A thin temperature measuring layer deposited on the rear surface provides a signal proportional to the platelet temperature. The signal is amplified and supplied to a sensing and control device which regulates the electrical power supplied to the resistance layer from a variable power supply whereby the platelet is maintained at a constant temperature. The platelet may be enclosed in a housing having a radiant energy transmitting window opposite the resistance layer. Electrical leads connected to the resistance layer and temperature measuring act to support the platelet in the housing.

3 Claims, 3 Drawing Figures

PATENTED SEP 26 1972 3,694,624

INFRARED RADIATOR ARRANGEMENT

The invention concerns an infrared lamp arrangement for infrared analyzers, which has a constant radiated power.

In the measuring technique, the concentrations of different gas molecules in hetero-atomic samples are determined by means of infrared analyzers in which the absorption of infrared radiation by the molecules is investigated. The stability of such a measuring system depends primarily on the constancy of the infrared radiation source.

It is known to utilize infrared lamps using stabilized voltage or current as sources of radiation. However, the applied voltage or the current does not constitute an absolute measure for the radiation striking the sample. According to Stefan-Boltzmann's law, the radiation energy per cm² emitted in unit time is proportional to the fourth power of the temperature of the radiator. Therefore, double-beam infrared spectrophotometers are used, in which the radiation is split up in a reference path and a sample path and the radiation intensity is controlled by the reference path. Such a reference path, however, involves considerable expense.

Briefly, the present invention provides an infrared source arrangement for infrared analyzers which has a constant radiated power in which the radiator is provided with a temperature measuring element, the measuring element measuring the temperature of the radiator and supplying, via an amplifier, a signal to a control device controlling the electrical power supplied to the radiator and thus maintaining the radiator at a constant temperature. In one embodiment the infrared source includes a ceramic platelet having a thin resistance layer deposited upon the front surface thereof and a thin temperature measuring layer deposited upon the rear surface thereof.

Accordingly, an object of the present invention is an infrared lamp arrangement in which the temperature of the radiator is maintained constant by control means, thereby resulting in a constant radiated power of the arrangement.

Other objects and many of the attendant advantages of this invention will be readily appreciated as the same becomes better understood by reference to the following detailed description when considered in connection with the accompanying drawing in which like reference numerals designate like parts throughout the several views thereof and in which.

Figure 1:
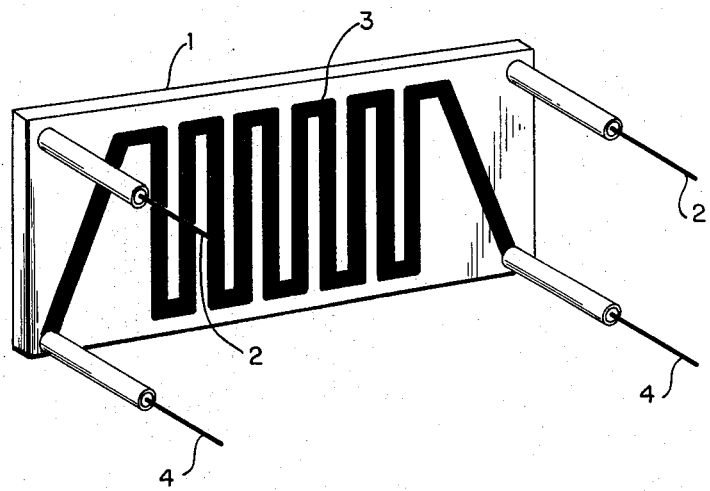
FIG. 1 illustrates a perspective view of a radiator according to the invention.
Figure 3:
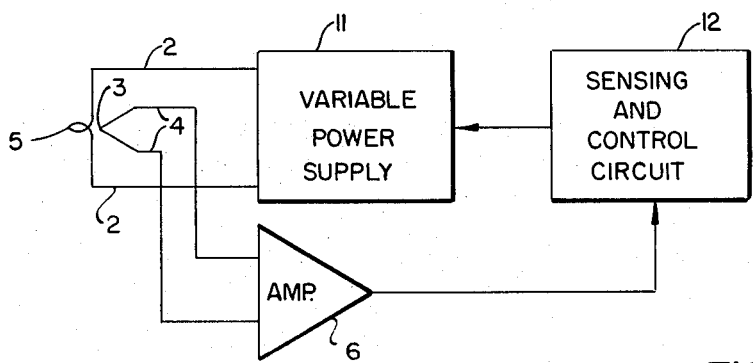
FIG. 3 illustrates a schematic of the infrared lamp system according to the invention.

Referring now to FIGS. 1 and 3 the infrared radiator arrangement according to the invention comprises a ceramic platelet 1 provided on its front surface with a single-sided, vapor-deposited heating resistance layer 5. Further, the platelet 1 is provided with a pair of electrical leads 2 connected to the resistance layer 5 for energizing the layer. On the rear of the platelet 1 a thin temperature measuring layer in the form of a platinum resistance thermometer 3 is provided by means of vapor-deposition or by cementing or sintering. The resistance thermometer 3 is connected to an amplifier 6 via the electrical leads 4. The signals emitted by the amplifier are supplied to a sensing and control device 12.

After application of a voltage to the leads 2 of the resistance layer 5 by variable power supply 11, the resistance layer is heated and emits radiation as a function of its temperature. Simultaneously, the resistance thermometer 3 provided at the rear of the platelet 1 measures the temperature of the platelet 1. Due to the small mass of the radiator platelet 1, this measuring operation can be performed with very little lag and great exactness.

The signal from the resistance thermometer is supplied via the leads 4 to the amplifier 6. The amplified signal from thermometer 3 is supplied to a sensing and control circuit 12 which senses any change in the signal from a desired value and provides a control signal to the variable power supply 11 to increase or decrease the power to resistance layer 5 to maintain its temperature constant.

Figure 2:
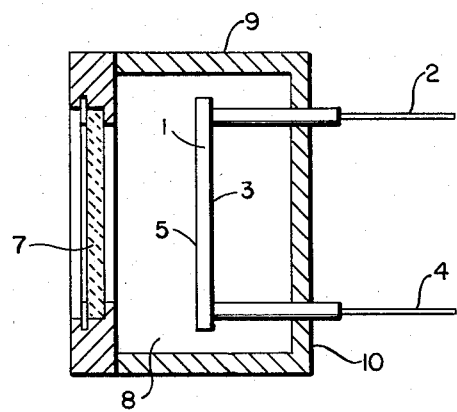
FIG. 2 illustrates a cross-sectional view of a radiator mounted in a housing according to the invention.

In FIG. 2, an operational example of an infrared radiator arrangement according to the invention is shown being mounted in a housing 9. The leads 2 and 4 pass through the rear wall 10 of the housing into the interior 8. The ceramic platelet 1 is supported by the leads 2, 4. The front wall of the housing has an aperture closed by a window 7 opposite the platelet 1.

There has been illustrated and described an infrared lamp or radiator arrangement in which the temperature of the radiator is sensed and maintained constant by control means to provide a constant radiated power output. Although particular components and structure have been described in connection with the specific embodiment, it is understood that other embodiments and components may be utilized and various changes, modifications and substitutions made without departing from this invention.

What is claimed is:

1. A compensated infrared radiator for infrared analyzers comprising:
    a ceramic platelet having a front surface and a rear surface,
    a thin heating resistance layer deposited upon the front surface of the platelet,
    a thin temperature measuring layer deposited upon the rear surface of the platelet providing a signal proportional to the temperature of said platelet,
    variable power supply means connected to said resistance layer for supplying power thereto, and
    sensing and control means connected to said temperature measuring layer and to said variable power supply for sensing changes in said temperature proportional signal and controlling said variable power supply to maintain the temperature of said heating resistance layer substantially constant.

2. The infrared radiator defined in claim 1 wherein said temperature measuring layer comprises a platinum resistance thermometer.

3. The infrared radiator defined in claim 2 further comprising a housing having a radiant energy transmitting window formed therein with said platelet disposed within said housing having the heating resistance layer arranged opposite said window, electrical lead means connected to said heat resistance layer and to said platinum resistance thermometer, said lead means extending through one wall of said housing and supporting the platelet in said housing.

* * * * *